United States Patent [19]
Karlin et al.

[11] Patent Number: 5,963,126
[45] Date of Patent: Oct. 5, 1999

[54] VISUAL SIGNALING DEVICE

[75] Inventors: James H. Karlin, Fairport; Stephen T. Vukosic, Rochester; Michael F. Mastin, Livonia, all of N.Y.

[73] Assignee: Star Headlight and Lantern Co, Inc, Avon, N.Y.

[21] Appl. No.: 09/028,230

[22] Filed: Feb. 23, 1998

Related U.S. Application Data

[60] Provisional application No. 60/038,290, Feb. 27, 1997.

[51] Int. Cl.$^6$ .................................................. G08B 23/00
[52] U.S. Cl. ........................ 340/321; 340/331; 340/691.1
[58] Field of Search ..................................... 340/321, 331, 340/332, 815.42, 815.43, 815.44, 815.45, 815.23, 691.1, 691.4, 691.5, 691.7, 908, 908.1; 362/102, 183, 184

[56] References Cited

U.S. PATENT DOCUMENTS

| | | | |
|---|---|---|---|
| 3,728,708 | 4/1973 | Culbertson | 340/321 |
| 4,468,656 | 8/1984 | Clifford et al. | 340/539 |
| 4,678,450 | 7/1987 | Scolari et al. | 446/405 |
| 4,959,637 | 9/1990 | Woods et al. | 340/573 |
| 5,081,568 | 1/1992 | Dong et al. | 362/184 |
| 5,103,215 | 4/1992 | Taylor et al. | 340/691 |
| 5,633,623 | 5/1997 | Campman | 340/321 |
| 5,697,695 | 12/1997 | Lin et al. | 340/321 |

OTHER PUBLICATIONS

Sasaki Electric Corporation, Patlite Instruction Sheet, Jan. 1995.
Federal Signal Corporation Instruction Sheet for Models LSS–024 and LSS–120, Date Jun. 1995.

*Primary Examiner*—Jeffery A. Hofsass
*Assistant Examiner*—Van T. Trieu
*Attorney, Agent, or Firm*—Harris Beach & Wilcox, LLP.

[57] ABSTRACT

A visual signaling device has one or more light source modules arranged in a stack. Each module is of "Tri-liptic" i.e. generally triangular shape, but with the triangle corners rounded. Inside the triangle, is a perfect circle, to aid in the optical dispersion of the light source. The modules are each formed by back and front moldings. The front molding defines one of the sides of the module, while the back molding defines the other two sides of the module. The light source module contains a light source (incandescent, halogen, rotating, strobe or LED) on a printed circuit board. This module also contains the electronics, which operate the light source, and can cause it to flash, be illuminated constantly or operate a rotating reflector around a stationery bulb. A conduit, which is a strip of printed circuit board with connectors at its opposite ends, extends between the top and bottom of each module of the stack. The board containing the light source is inserted via guides into another connector which is attached to the conduit. The light source module may readily be removed for purposes of changing bulbs, which burn out, or to exchange light sources of different type, for example a rotating reflector source for a stationery bulb source. The back molding is closed by the front molding to form a sealed enclosure for the light source module. Modules may be inter-connected into a stack by connection of the top and bottoms of the back moldings of adjacent modules in the stack by means of interlocking projection and slots. A cover and a base may be connected to the topmost and lowermost modules of the stack. The base may contain an audible warning source. The connection of the modules into the stack does not require separate rods or screws which extend through the entire stack.

22 Claims, 5 Drawing Sheets dentical. Each module is made up of a two part enclosing body or shell. Preferably the shell is generally triangular in cross section through the vertical axis of the module, but with rounded corners, thereby forming what is called herein a tri-liptic shape, since it has both triangular and elliptical characteristics. One part of the shell which forms two sides of the tri-liptic shape provides for the mounting of plates, such as printed circuit boards, containing light sources, which are referred to herein as light source modules. The tops and the bottoms of the shells have openings which enable them to be aligned and facilitate interconnection into a stack. A linear circuit board provides a conduit extending from the top to the bottom of each module. The circuit board is connected to an intermediate connector for receiving a connector of the light source module; the circuit board also having end connectors which connect to other modules and to an electric power source. If desired a base unit may be provided with one or more modules arranged vertically above the base. The base unit may be a shell which contains an audible signaling device. A cover is preferably connected over the top of the upper most module to seal the unit. Preferably, after assembly of the module in a stack, a panel providing the part, which forms the remaining side of tri-liptic shape, is attached to close the other part to the module, thereby providing an enclosure containing the light source which is sealed against adverse environmental affects.

VISUAL SIGNALING DEVICE

This application claims the priority benefit of U.S. Provisional application, Ser. No. 60/038,920, filed Feb. 27, 1997.

DESCRIPTION

The present invention relates to visual signaling devices, and more particularly to signaling lights which may be arranged in stacks of separate modules and provide illumination of different color suitable for use in industrial plants and factories to indicate the status (operating condition) of assembly lines and other apparatus therein. Such devices may be called stackable beacons or signal towers.

Various signaling devices which are made up of modules which may be stacked in a vertical array have been proposed and are even commercially available. The disadvantage of such stackable modules is that they must be structurally rigid to withstand vibration and mechanical impacts as are prevalent in industrial environments. They also must be operable in various environmental conditions of humidity and contaminants. Accordingly, the design of such signaling devices is complicated by means especially for inter-connection of the modules into a stack, to render them rugged and environmentally stable, which makes such devices difficult to manufacture and, otherwise, adds to their cost.

Another drawback of such devices is that it is difficult to change a burnt-out bulb or to change the type of light source, for example a stationary lamp, for a rotating warning lamp assembly, or to replace an incandescent warning lamp with a halogen lamp or other light source. Such devices also do not contain strobe circuitry or LEDs, as may be desired for certain signalling applications. In most cases the available stackable devices must be totally disassembled in order to change light sources and even to replace burnt out bulbs, especially where the environmental integrity of the internals of the modules is to be maintained.

Accordingly, it is a principal object of the present invention to provide improved signaling devices, which are available as modules, which can be arranged individually on a base or in a stack one module above the other.

It is a still further object of the invention to provide improved stackable modules which have replaceable light source modules so that different types of light sources, for example incandescent, halogen, rotating strobe or LED sources may be used and interchanged as desired, and also for the purpose of retrofitting an already installed signaling device.

It is a still further object of the present invention to provide an improved visual signaling device made up of modules which can be stacked in a vertical array and which are essentially the same, and do not require special hardware, such rods as which extend through the entire stack, in order to assemble the modules into the stack.

It is a still further object of the present invention to provide improved visual signaling devices made up of modules which can be stacked, which modules have with fewer parts and lower fabricating cost than devices made up of stackable modules which have been proposed and/or which are now commercially available. It is a further object of the invention to provide an improved visual signalling device having a plurality of modules, each of which is a self contained unit, needing only to be supplied with power to work.

Briefly described, a visual signaling device embodying the invention has one or more modules, which may be Therefore, each module has a "tri-liptic" shape which is made of two parts, one of which provides the back thereof which provides mechanical support and facilitates stacking of modules as well as a face which can accept a seal which seals the module when the other, or front of the tri-liptic shaped body, is attached to the back thereof. There is complete interchangeablity of light source circuitry (incandescent, strobe, LED etc) without replacing or disassembling modules.

The foregoing and other objects features and advantages of the invention, as well as the presently preferred embodiment thereof will become more apparent from reading of the following description in connection with the accompanying drawings in which.

Figure 2:
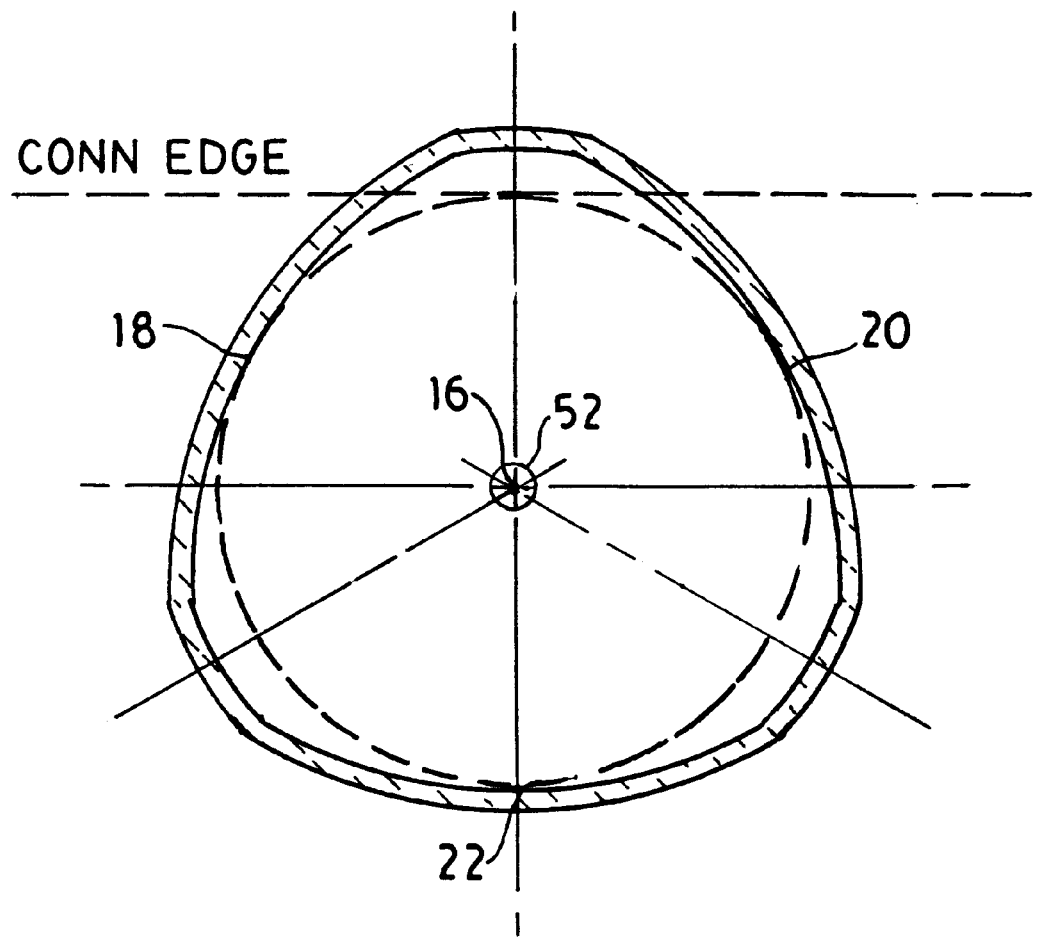
FIG. 2 is a top plan view of the device shown in FIG. 1A.

Referring to the drawings there is shown a visual signaling device having a plurality of modules 10 which are arranged in a vertical stack on a base 12. A cover 14 is attached over the upper most module. Each module has a generally tri-liptic shape, as shown in FIG. 2. The tri-liptic shape appears in cross section, the cross section being taken through a vertical axis 16 of the module and the stack. The tri-liptic shape has three sides 18, 20 and 22 which are arcuate and are tangential to a circle having a radius equal to a perpendicular to each side where it is tangent to the circle. One of the sides 22 is referred to herein, for the sake of simplifying the description, as the front side, while the other sides are referred to as forming back sides of the module.

With the "tri-liptic" shape, flat edges are presented for providing a weather tight gasket seal. There is also a form factor which allows quick, easy and direct access for replacing lamps and/or circuits. Disassembly or removal of all modules located above the module to be relamped is not required. There is also greater stability than for a cylindrical structure. The triliptic shape provides a larger illumination area than a cylindrical stack of lights, and also provides a highly distinctive appearance.

Figure 1:
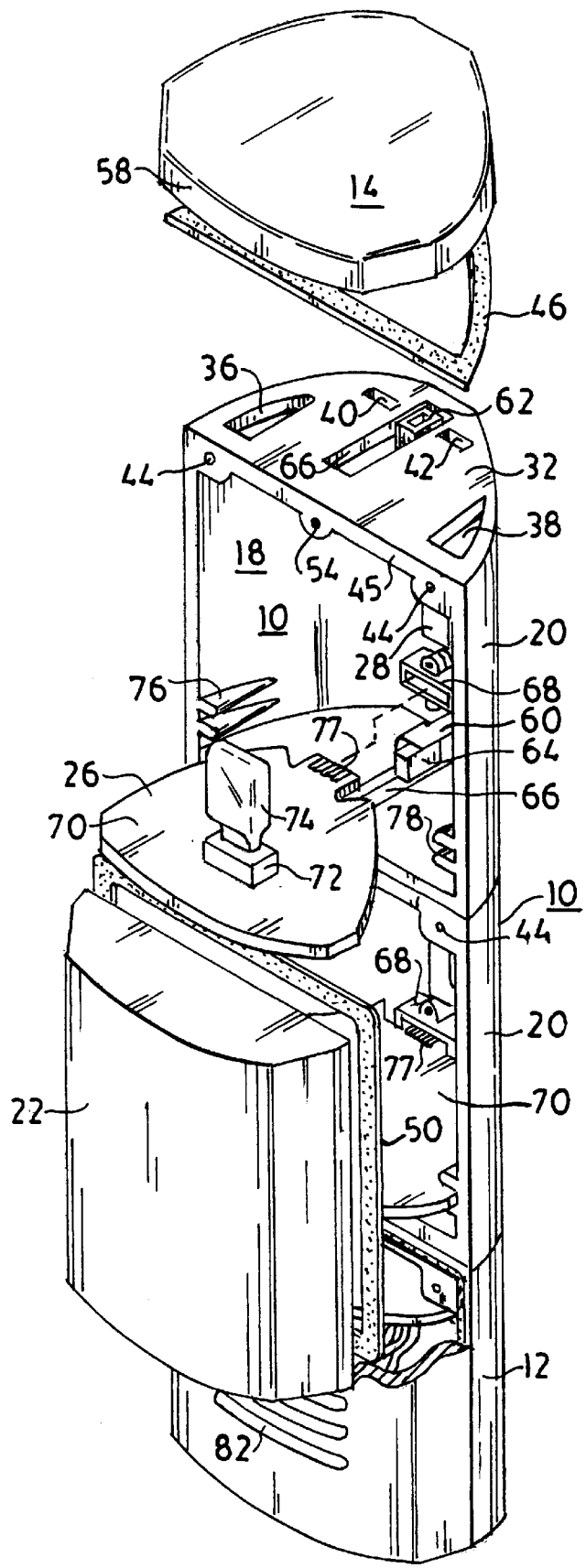
FIG. 1 is an exploded, perspective view of a visual signaling device embodying the invention.

As shown in FIG. 1, the back sides 18 and 20 are preferably formed as a one piece part, as by molding it out of plastic material, which may be transparent, translucent, or striated to provide a light diffuser. The front side 22 is a single part which also may be molded from plastic and also may be of the same material and appearance as the back side. When assembled together, the sides form the tri-liptic shape and provide an enclosure or shell containing a light source module 26 and an electrical assembly 28, also shown in FIG. 5. Each module 10 has a top 32 and a bottom 34, which in the case of the top 32 and the bottom 34 of the rear sides of the module may be molded integrally with the sides 18 and 20 thereof. Also, the front side 22 has a top and a bottom, which is molded integrally with the face portion thereof.

The back side of the module provides the structural support which enables the modules to be stacked, as well as a housing for the light source module 26 and the electrical assembly 28. The top 32 has two generally triangular openings 36 and 38 and may have two additional openings 40 and 42. Pins or protuberances (not shown) extend into these openings, from the bottom of the adjacent module of the stack, for alignment and for rigidly interconnecting modules to each other in the vertically stacked array. Other arrangements of openings (preferably at least three) are provided in the top 32 of each module. The protuberances may alternatively be in the bottoms and the openings in the top of adjacent module. The base 12, and also the cover, has pins or projections (not shown) complimentary to, and receivable in the openings 36, 38, 40 and 42 so as to connect the base and cover to the module or modules of the stack adjacent thereto. The modules may for example be 3 inches tall and a stack may contain up to five modules.

After the back sides of one or more modules 10 are assembled, screws (not shown) are inserted into holes 44 in a lip 45 which defines a flat front edge of back side part of the module and into threaded holes in the projections or pins which extend through the openings 36 and 38, thereby rigidly connecting the modules. This lip 45 presents a flat surface against which a gasket seal 50 mold to an edge face of the front 22. Screws 52 which extend through receiving holes 54 therefore provide clamping forces. The flat surfaces provide for a tight weather seal when the parts of the module are put together. Similarly, a seal 46 is clamped between flat surfaces of the top 32 of the upper most module and an edge of the rim 58 of the cover 14.

Prior to attachment of the front side 22, the electrical assembly 28 is installed in the back part forming the sides 18 and 20. The electrical assembly as shown in FIG. 5 may include either a ribbon cable or a strip of printed circuit board 60 (or 60a FIG. 5 A) containing leads which extend between upper and lower connectors 62 and 64. Slots 66 provide clearance for the connectors 62 and 64. The strip 60 of circuit board may be connected by tabs, straps or screws to the back part formed by the sides 18 and 20. An intermediate connector 68 is attached at an ear 71 to form part of the electrical assembly. The electrical assembly may be a straight board to which the connectors 62, 64 and 68 are attached along a side thereof. The intermediate connector 68 receives a circuit board 70 on which a socket 72 for a lamp bulb 74 (shown by way of example as a halogen bulb) is received. A male connector 77 is provided at an edge of the board. The board has a generally tri-liptic shape matching the shape of the module. Other electrical and mechanical components, such as a rotator in the case of a rotating reflector or strobe flashing circuits, may be attached to the board 70 and connected to the printed leads on the board 70. The board is aligned by guides 76 and 78 which form a slot through which a board is inserted a sufficient distance so that its connector 77 is received and makes contact with the connector 68. After assembly of the board the front part 22 of each module are attached to complete the assembly.

Figure 3:
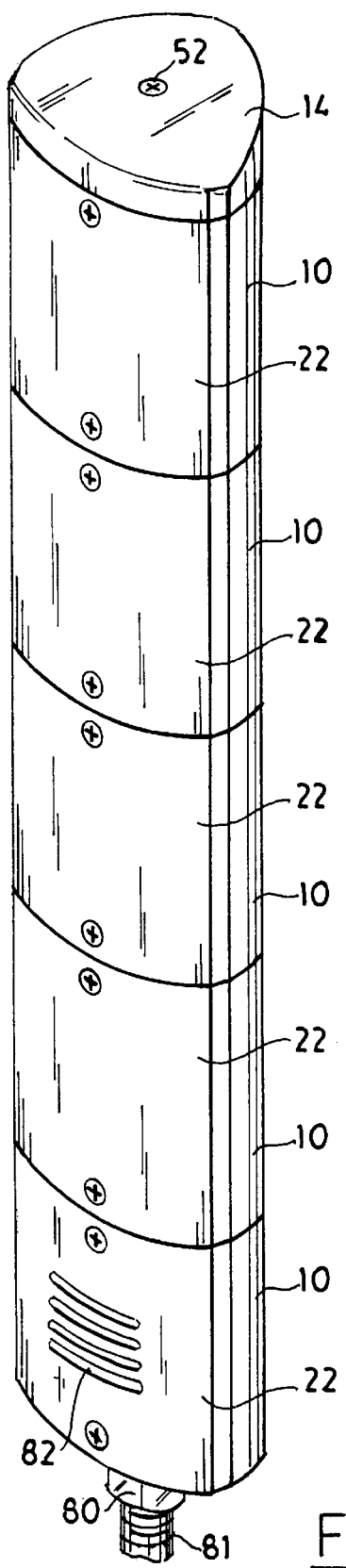
FIG. 3 is a view of a visual signaling device similar to that shown in FIG. 1, but having four instead of two modules.
Figure 4:
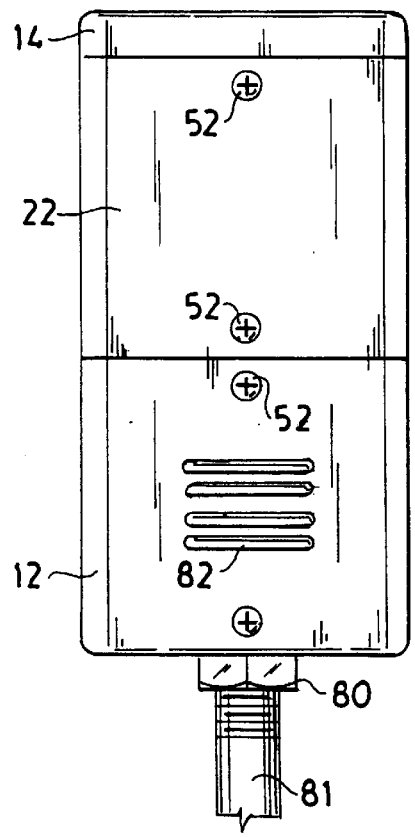
FIG. 4 is a front elevational view of a visual signaling device having one module.

As shown in FIG. 4, the base module 12 may have a threaded hole for receiving a pipe 80 which extends from the frame or apparatus on which the signaling device is mounted. Other forms of attachments, such as flanges on the base may alternatively be used. The base 12 may contain an audible signaling device of the type known in the art, and in such event holes 82 may be provided through which the sound may emanate. FIG. 4 shows one module installed on the base. FIG. 1 shows two modules and FIG. 3 shows a stack of four modules.

Figure 1A:
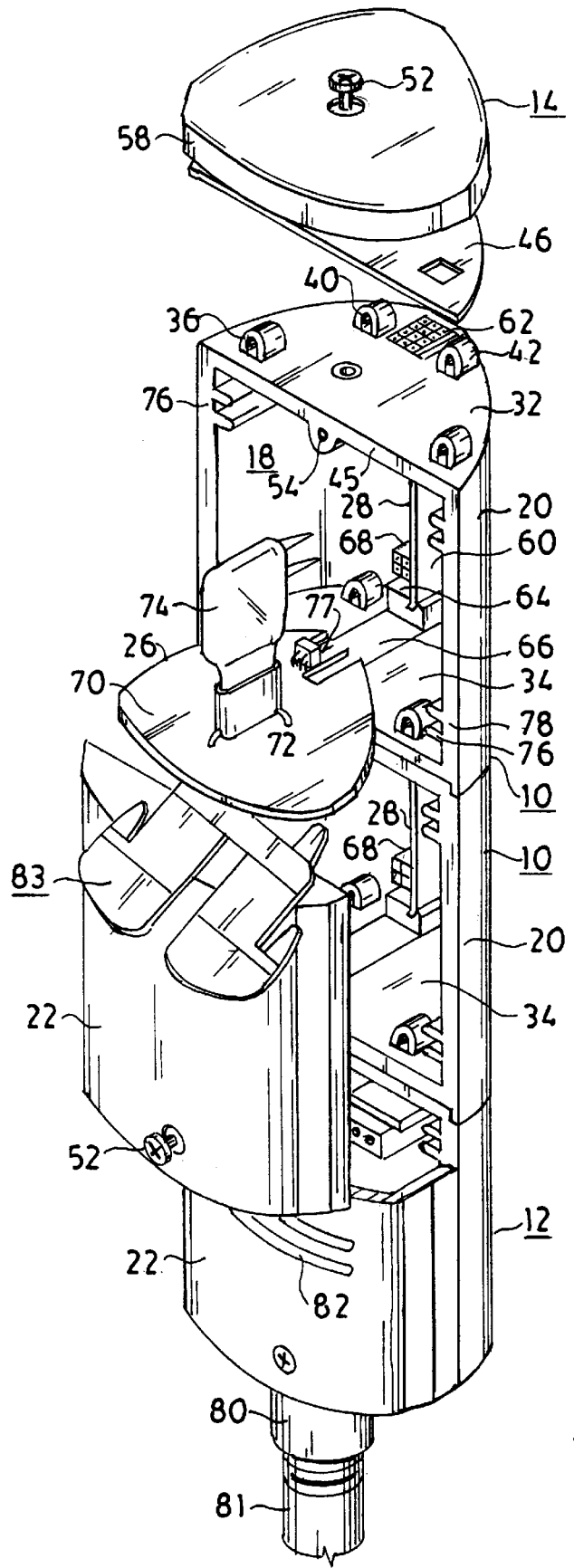
FIG. 1A is a view like FIG. 1 with some additional improvements.

FIG. 1A shows top 32 having multiple looped protuberances 42 instead of openings. These pins or protuberances extend into openings, from the bottom of the adjacent module of the stack, for alignment and rigidly interconnecting modules to each other in the vertically stacked array. Modules are then firmly attached the adjacent module below it via some type of fasteners that connect into the protuberances of the module below it. Screws, clips, rivets, or the fastening devices such as the interlocking "key" 83, provide a rigid connection between modules that can be disassembled. Cap or cover 14 can be attached using screw 85 via screw hole 84.

Figure 5A:
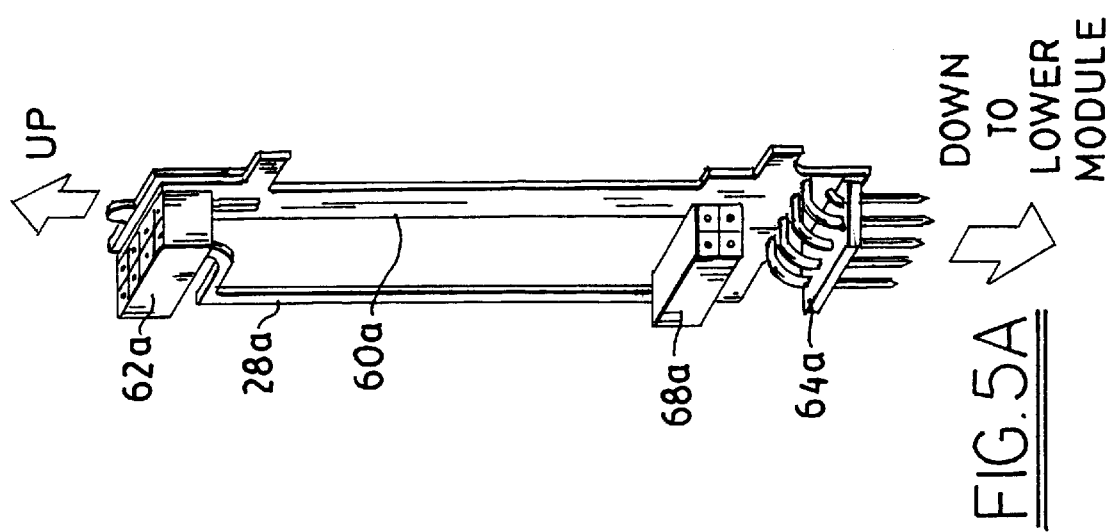
FIG. 5A is a view similar to FIG. 5 of improved cabling and connections.
Figure 5:
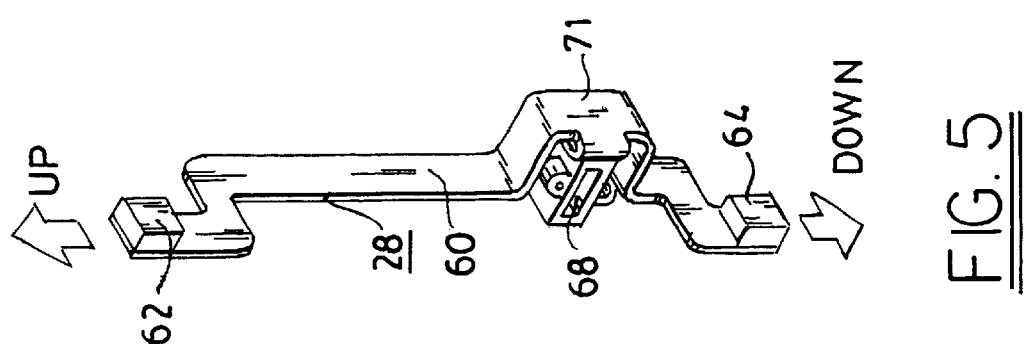
FIG. 5 is a perspective view of the electrical, connections within each of the modules shown in the other figures.

The device of FIG. 1A uses the connector assembly of FIG. 5A uses the connector assembly of FIG. 5A. Parts described in connection with FIG. 5 are designated with the same numbers followed by an "a".

From the foregoing description it will be apparent that there has been provided an improved visual signaling device which is provided by modules which may be stackable without the need for external hardware. Also, light source modules are used which may be interchanged and retrofitted readily without disassembly of the entire stack of modules. Variations and modifications in there herein described visual signaling devices, within the scope of the invention, will undoubtably suggest themselves skilled in the arts. Accordingly, the foregoing description should be taken as illustrative and not in a limiting sense.

We claim:

1. A visual signaling device which comprises at least one self-contained module having at least two parts which form an enclosure, an electrical assembly presenting connectors at ends thereof and intermediate connector means connected between top and bottom of said module, and a light source module interchangeably contained in at least one of said parts and connectable to said intermediate connector, said module having means for connection together of said module with at least one more self-contained, like said one module, each having electrical assemblies, light source modules and connector means like said one module, such that a plurality of said modules are assembleable in a vertical array.

2. The device according to claim 1 wherein said plurality of modules are in a stack forming said vertical array.

3. The device according to claim 2 whenever said modules each have a top and bottom between said sides and said connection means has inter-connections which extend between said tops and bottoms of said one parts of said modules to connect said one parts in said stack and provide rigid support for said stack.

4. The device according to claim 3 wherein said light source module comprises a plate and a lamp on said plate, a cable in said assembly connected to said end connections and said intermediate connector, and a second connector extending from said plate and connectable to said intermediate connector.

5. The device according to claim 4 wherein said cable and a rigidifying member are integrated with each other and with said end and intermediate connectors to provide said connection means based on the word remarks.

6. The device according to claim 1 wherein said modules are of tri-liptic shape based on a perfect circle, having three sides, one part forming two of said sides of said module and the other part forming a third of said sides thereof.

7. The device of claim 6 further comprising a base of said tri-liptic shape on which said stack of modules is mounted at the bottom thereof.

8. The device of claim 7 further comprising an audible source in said base.

9. The device of claim 3 further comprising a cover of said tri-liptic shape attached to said stack at the top end of the uppermost module thereof.

10. The device according to claim 1 further comprising means sealingly interconnecting said parts.

11. The device according to claim 10 further comprising seals between said plurality of modules in said array.

12. The device of claim 4 wherein said light source module has means for mounting on said plate different sources of illumination.

13. A beacon comprising at least one module having a housing which provides structural support for the module and enables a plurality of modules to be stacked into a vertical array of modules, said housing having two parts, which provide a shell when assembled, of generally triangular shape having three sides, one of said parts having two of said sides meeting at an angle so as to define two sides of said generally triangular shape, said two sides presenting edges of a third side of said generally triangular shape, said one part providing the principal structural support of said module and of said vertical array, said one part also providing the support for internals of said module, said internals comprising an electrical assembly presenting a plurality of connectors and a light source module removably receivable and connectable to one of said plurality of connectors, holders in said one part engaging said light source module when connected to said one connector in supported relationship with said one part.

14. The beacon according the claim 13 wherein said one part of said module has a top and bottom extending across said two sides at opposite ends of said two sides, and means provided by said tops and bottoms disposed for engagement with others of said modules to assemble said modules into said array.

15. The beacon according to claim 14 further comprising a cover engageable with said engagement means of said top of said one module, said one module being the upper most module of said plurality of modules in said array.

16. The beacon according to claim 14 further comprising a base engageable with said engagement means of said bottom of said one module, said one module being the lower most of said plurality of modules in said array.

17. The beacon according to claim 14 wherein said electrical assembly comprises a cable supported in said one of said parts and having end connectors exposed at said top and bottom and having a third connector disposed intermediately between said top and bottom and connected to said cable, said third connector providing said one connector.

18. The beacon according to claim 17 wherein said cable is a rigid member from which said end connectors extend respectively upwardly and downwardly from the ends of said rigid cable, and said third connector extends laterally from said rigid cable.

19. The beacon according to claim 14 wherein said engagement means comprises protuberances from one of said top and bottom and openings in the other of said top and bottom which when in different ones of said plurality of modules aligns said modules into said vertical array.

20. The beacon according to claim 13 wherein a trilyptic shape provides said generally triangular shape of said shell.

21. The beacon according to claim 13 wherein said light source module comprises a plate on which a lamp is mounted having a connector removably pluggable into said one connector.

22. The beacon according to claim 21 wherein said plate is a printed circuit board.

* * * * *